June 13, 1933. L. T. FREDERICK 1,913,875
MICA TREATING APPARATUS
Original Filed Oct. 2, 1926   2 Sheets-Sheet 1

INVENTOR
LOUIS T. FREDERICK
By Cheever & Cox ATTYS.

INVENTOR
LOUIS T. FREDERICK
By Cheever & Cox ATTYS

Patented June 13, 1933

1,913,875

UNITED STATES PATENT OFFICE

LOUIS T. FREDERICK, OF VALPARAISO, INDIANA, ASSIGNOR, BY MESNE ASSIGNMENTS, TO CONTINENTAL DIAMOND FIBRE COMPANY, OF NEWARK, DELAWARE, A CORPORATION OF DELAWARE

MICA TREATING APPARATUS

Application filed October 2, 1926, Serial No. 139,219. Renewed July 11, 1932.

This invention relates in general to machines for treating mica and has more particular reference to mica laying machines for making composite mica boards, or mica plate. My invention has for an object the provision of a machine by which mica plate of greater thickness than heretofore possible may be produced in a single operation without an attendant increase of manufacturing cost and an equally important object is to provide means for sorting ungraded mica and separating a uniform grade of thin mica flakes which may then be incorporated in the boards or used for other purposes if desired.

For these and other purposes, I employ a machine in which an endless reticular conveyor operates over a stationary cylindrical suction drum. The unsorted mica flakes are gravitated past the suction drum and the thin flakes are thereby drawn against the conveyor. This creates what may be termed a single thickness of mica flakes upon the reticular conveyor. These flakes may of course be removed by dumping them into a receiver and used for any purpose, but, inasmuch as graded flakes are usually made up into boards as a preliminary to further fabrication, I prefer to immediately form the flakes into boards while they are still on the conveyor and consequently provide means to sprinkle the flakes with a suitable adhesive to thus bind the particles or flakes of mica together in an integral sheet. Thus a sheet of mica may be produced, the thickness of which is only a trifle greater than the thickness of the mica flakes which went to make up the sheet.

To form or create mica plate it is customary to secure the requisite number of these sheets together to produce the desired thickness. Hence the greater the thickness of the individual sheets of mica the fewer sheets it is necessary to handle and secure together in order to produce the mica plate.

The present invention is particularly designed to produce a sheet of greater thickness than has heretofore been possible, thereby reducing the number of sheets necessary for the production of mica plate. This obviously reduces the manufacturing cost of plate mica by eliminating laying operations and the handling of the mica sheets represented by the additional thicknesses of the sheets produced by the present machine. Furthermore, the thicker sheets of mica have greater strength and are less likely to become damaged or broken in handling, thereby eliminating waste.

Another important object of my present invention is to provide for the selection of a substantially uniform grade of mica for incorporation in the sheets.

With the above and other objects in view, as will be apparent, this invention consists in the construction, combination and arrangement of parts, all as hereinafter more fully described, claimed and illustrated in the accompanying drawings wherein Figure 1 is a side elevation of a machine constructed in accordance with the present invention.

Figure 1:
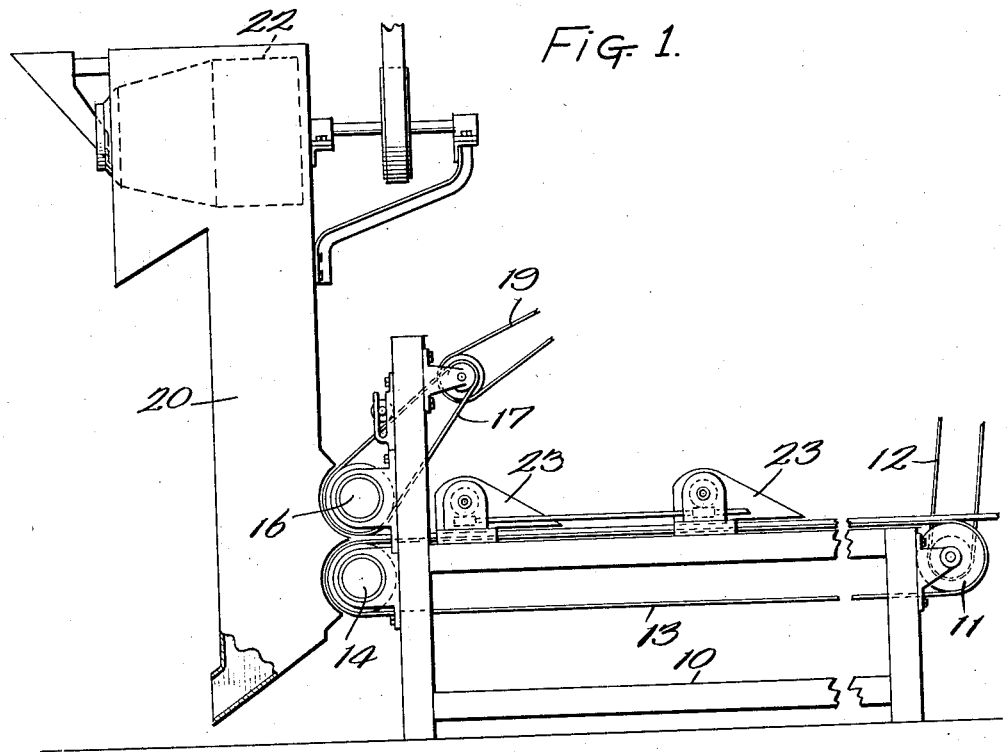
Figure 2:
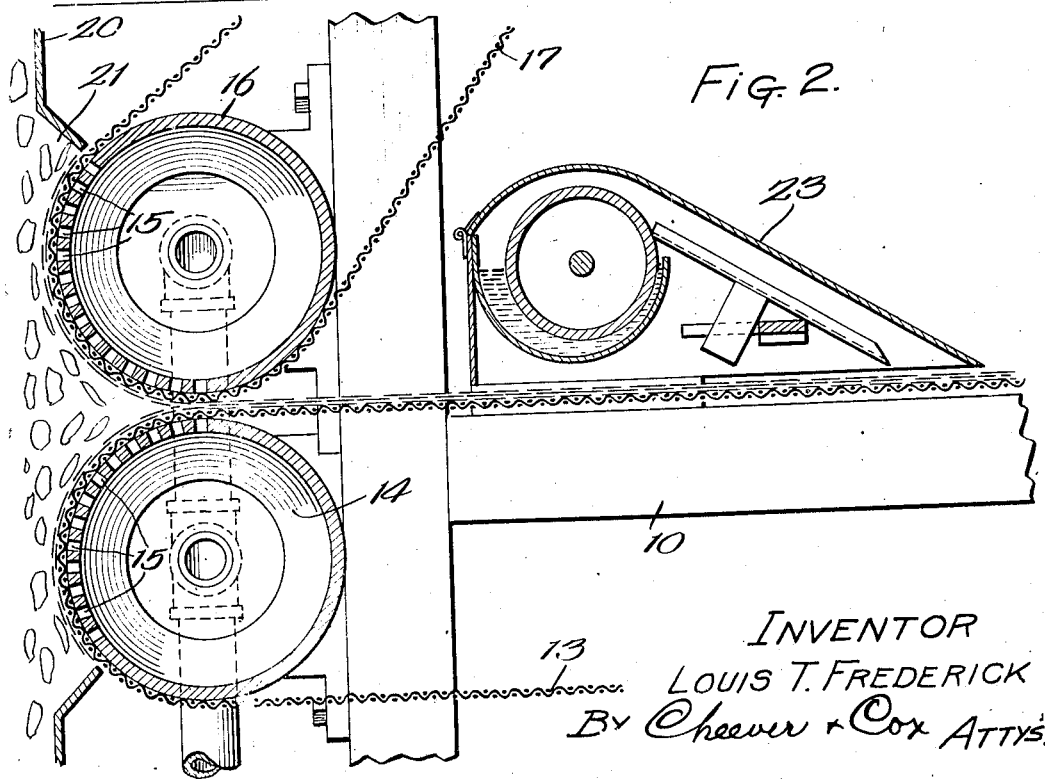
Figure 2 is a central longitudinal section through a portion of the machine and suction drums carried thereby.
Figure 3:
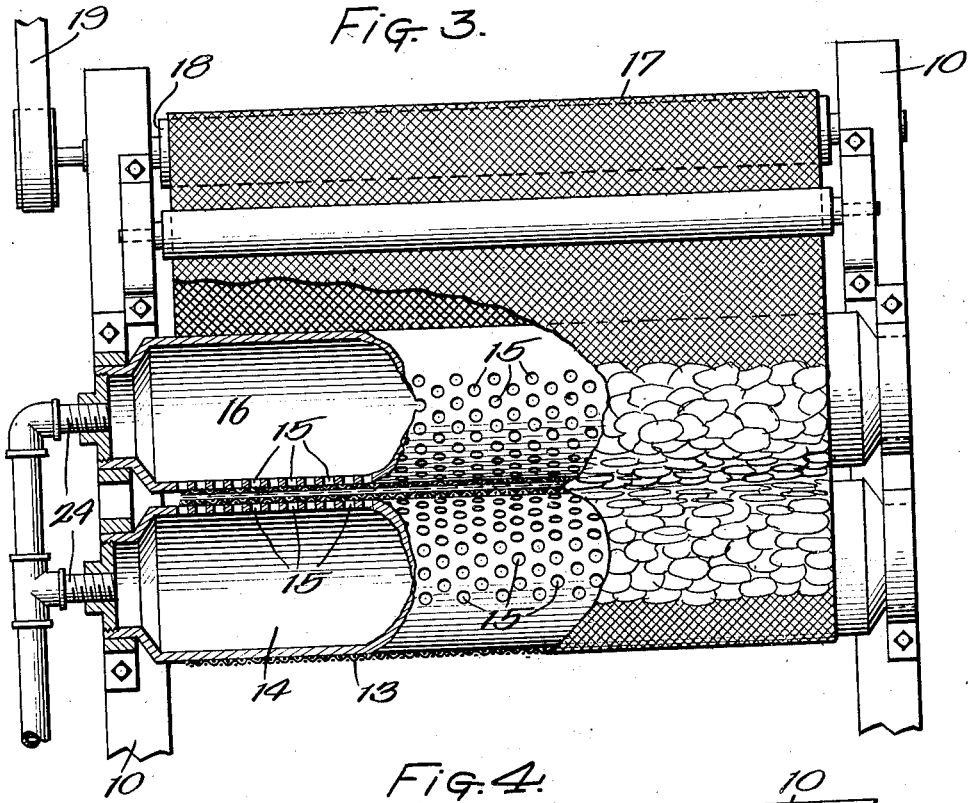
Figure 3 is an end elevation of the machine illustrating parts thereof in section.
Figure 4:
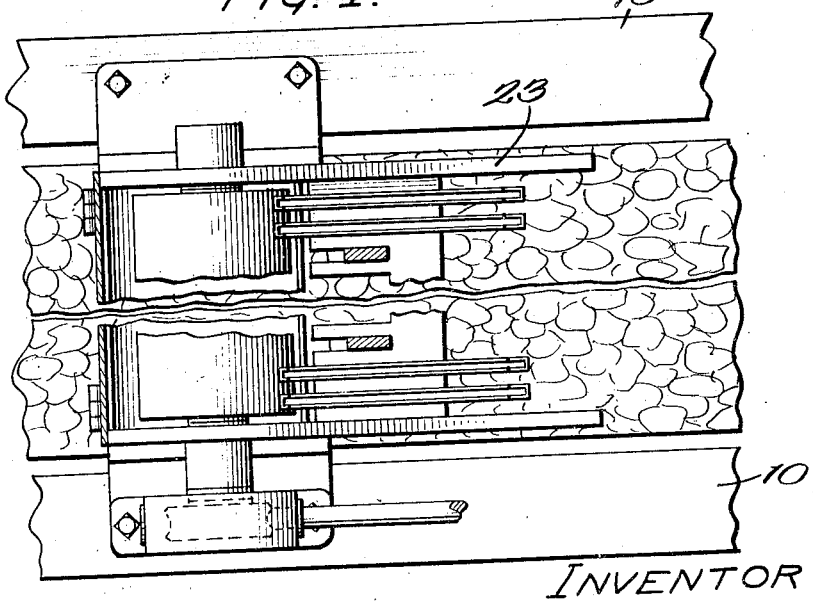
Figure 4 is a plan view, partly in section, of the mechanism for distributing or spreading the adhesive or binder.

Reference being had more particularly to the drawings, 10 designates the frame of the present machine with a roller 11, operated by a belt 12, located at one end of said frame. This roller constitutes the driving mechanism for the main continuous reticular conveyor 13, which operates over the roller 11, and extends throughout the entire length of the machine. At its end opposed to the roller 11, the reticular conveyor 13 operates over a fixed cylindrical, primary suction drum 14, mounted on the frame 10 coplanar with the roller 11. A series of perforations 15 pierce the wall of the suction drum 14, throughout the portion of the surface thereof positioned away from the frame 10. A secondary suction drum is disposed above the primary suction drum and is also provided with apertures 15 in the portion of the wall situated away from the frame 10. Operating over the secondary suction drum 16, and a driving roller 18 is an auxiliary reticular continuous conveyor 17, which occupies a position above and at an angle to the main conveyor 13.

Pipes 24 are connected with the drums 14 and 16 and to a suction apparatus (not shown) whereby a suction may be created within the drums. This suction operates through the apertures 15 in portions of the walls of said drums and the conveyors 13 and 17, and is sufficiently strong to attract and hold against the conveyors 13 and 17 mica flakes which may pass before said apertures. It will be manifest that when the conveyors 13 and 17 are completely covered with mica flake the suction within the drums is unable to act on and attract any further flakes.

Disposed for cooperation with the suction drums 14 and 16 is a flake delivering chamber 20, which constitutes an elongated box or conduit equal in width to the length of the suction drums 14 and 16, and having a discharge opening 21 in the side thereof facing said suction drums. The upper end of the chamber 20 has a perforated rotary hopper 22 mounted therein. The rotation of this hopper 22 causes the mica flakes contained therein to be discharged into the delivering chamber 20 in a relatively uniform cloud whereby the mica flakes are freed one from the other and may be acted on individually by the suction of the drums 14 and 16, which attracts and lays the mica flakes on the reticular conveyors 13 and 17. The mica flakes thus laid are so held on the reticular conveyors that they overlap one another and therefore present a thickness somewhat greater than the thickness of the individual mica flakes.

After the mica flakes are positioned on the conveyors 13 and 17 the movement of said conveyors carries the flakes away from the apertures of the drums 14 and 16 whereby the suction ceases to act upon the mica flakes. The movement and position of the reticular conveyor 13 permit the mica flakes positioned thereon by the suction of the drum 14 to remain on the conveyor after it has passed from engagement with the drum 14, and assumes a horizontal position. On the other hand the auxiliary conveyor, occupying a position generally at an angle to the line of the primary conveyor 13, carries the mica flakes beyond the perforations 15 in the drum 16, away from the influence of the suction of the drum 16, to permit them to fall upon the primary conveyor 13 in substantially the same relative positions that they occupied when held against the conveyor 17. Thus two layers of mica flakes are superposed on the conveyor 13 prior to the application of the binder.

It will be apparent that by creating a cloud of mica flakes in the tower 20 adjacent the suction drums 16 and 14, the latter will be allowed to exert a suction separating effect upon the mica flakes of the cloud which will be attracted toward the perforated surface of the drums. I have found that the lighter and thinner flakes are more readily attracted than the heavier and thicker flakes so that when the device is in operation the lighter, thinner flakes will be attracted to the drum while the thicker flakes, on account of their greater weight, will fall past the drums under the influence of gravity. For this reason, by regulating the suction within the drums 16 and 14, I am able to separate a substantially uniform grade of mica flakes from the cloud in the tower 20. The maximum thickness of the separated flakes will be, of course, determined by the amount of suction exerted in the drums.

The continued operation of the conveyor 13 causes the flakes positioned thereon to be subjected successively to the action of a series of adhesive or binder spreaders 23, which so treat the mica flakes upon the conveyor 13 that they are secured one to the other to produce an integral sheet of mica in the manner known in this art. The sheet or strip is then removed from the conveyor as it passes over the roller 11.

From the foregoing it will readily be seen that the present machine produces a sheet of mica of approximately double the thickness possible with the machines heretofore in use. It is also apparent that by the provision of the auxiliary reticular conveyor 17 and the secondary suction drum 16 approximately twice the amount of mica flake may be laid on the conveyor 13 prior to its treatment by the spreaders 23. This obviously reduces the cost of manufacture of mica sheets as well as the cost of manufacture of the mica plate made up from said sheets. Also the sheets of mica produced are more substantial and are less likely to become broken or damaged in handling.

This machine may be used for other purposes than making mica flake. The chute 20 may be supplied with clippings of woven fabric or paper, and they may be either treated or untreated with bakelite or other binder. If the particles have not been previously treated with binder the binder will be supplied after the material has arrived on the carrier belt by a sprinkler or distributor exemplified at 23 in the drawings.

It will be evident that when the mica flakes or other particles are small the thickness of the product may be regulated by regulating the degree of suction in the suction drum. By increasing the suction a greater number of flakes will be held to the drum than where the suction is lighter.

Having thus described my invention what I claim as new and desire to secure by Letters Patent is:

1. In a mica laying machine the combination with a traveling endless, reticular conveyor, of a primary suction drum over which said conveyor passes whereby flake mica may be laid on the conveyor by the suction of said primary drum, a secondary suction drum positioned above the primary drum, and an auxiliary traveling reticular conveyor operating over said secondary drum at an angle to the first conveyor, on which flake mica may be laid by the suction of said secondary drum and subsequently delivered thereby to the first conveyor.

2. A mica laying machine having a primary and a secondary suction drum, a continuously traveling reticular conveyor operating over each of said drums, and means for supplying mica flakes to both said conveyors, said secondary drum and its conveyor being adapted to deposit its layer on the primary conveyor.

3. A mica laying machine having a primary and a secondary suction drum, a reticular conveyor passing over each of said drums, one of said conveyors having an approximately horizontal run to serve as a carrier for the flakes and the other conveyor being located above and arranged to deposit its flakes upon the former, and means for supplying mica flakes to said drums and conveyors.

4. A mica laying machine having a primary and a secondary suction drum, a continuous, traveling, reticular conveyor operating over each of said drums, and means for depositing a layer of mica on said conveyors, the conveyor operating over said secondary drum being positioned at an angle to the conveyor operating over the primary drum, and adapted to deliver its layer of mica thereto.

5. A mica laying machine having a pair of traveling conveyors, pneumatic means for simultaneously laying mica flakes on said conveyors, and means for releasing the flakes from one of said conveyors at a point above the other conveyor.

6. A device of the class described having a pair of traveling conveyors, suction means for simultaneously laying mica on both of said conveyors, and means for subsequently transferring and superposing the mica from one of said conveyors upon the mica on the other conveyor.

7. A device of the class described having a pair of continuous traveling conveyors, one positioned above the other at an angle thereto, and suction means for simultaneously laying mica flakes on both of said conveyors, said upper conveyor being adapted to deliver its mica flakes to the lower conveyor.

8. A device of the class described having a pair of continuous traveling conveyors, one positioned above the other at an angle thereto, and means for simultaneously laying mica on both of said conveyors whereby the mica on the upper conveyor may be transferred to the lower conveyor and superposed upon the mica thereon.

9. A device of the class described having two suction drums having horizontal, parallel axis one above the other, endless foraminous conveyor screens passing around said drums and having paths substantially tangential at one point, the upper screen extending upward and away from said point and away from its drum whereby the flakes adhering to it may drop onto the lower screen, and means for dropping a supply of mica flakes past said drums to enable some of said flakes to be sucked onto the screens.

10. In a device of the class described a moving conveyor for the work material, a plurality of suction devices, means for causing particles of the work material to pass adjacent to said suction devices to permit the material to be drawn toward the devices, and means for releasing the material from the devices in stacked relation on the conveyor whereby the final product comprises several layers.

11. A device of the class described having a receiver for mica, means for depositing a layer of mica on said receiver, a carrier pervious to air, having a portion overlying said receiver, means for creating suction through said carrier for holding mica flakes upon the under side thereof, and means for shutting off the suction at the portion of the carrier overlying the receiver to thereby cause the flakes to be deposited by gravity upon said receiver, over said layer of mica.

12. A device of the class described having a receiver for the mica, means for depositing a layer of mica upon said receiver, a carrier adapted to travel past a point above said receiver, said carrier being pervious to air, means for drawing air through the traveling carrier to cause mica flakes to adhere thereto, and means for shutting off the air flow from the carrier at said point to thereby cause the flakes to be deposited upon said receiver.

13. In a device of the class described, a work support for the mica, pneumatic means for depositing a layer of mica on said work support, and means for depositing another layer upon said support above said layer of mica.

14. In a device of the class described, a work support for the mica, means for depositing a layer of mica on said work support, an air pervious carrier having a portion overlying said work support, means for creating suction through said carrier to hold mica flakes upon the under side thereof, and means for relieving the suction at the portion of the carrier overlying the work support to thereby cause a second layer of mica to be deposited on the carrier.

15. In a device of the class described, a work support for the mica, means for depositing a layer of mica on said work support, a stationary suction means, an air pervious conveyor passing across said means and having a portion overlying said work support and means causing a stream of flaked mica to move past said suction drum adjacent said conveyor whereby mica flakes may be held upon the conveyor until released therefrom when the conveyor passes from the suction means.

16. Apparatus for assembling flaked material into sheets of substantially uniform thickness which comprises converging, foraminous screens, means for dropping mica flakes on one side of said converging screens, means for creating a suction on the other side of said screens to draw a layer of flakes onto the converging screens, means guiding said screens to a point of convergence and for thereafter changing the course of said screens whereby the layers of flakes adhering to the screens may be deposited on one of the screens and held thereon by gravity.

17. A device of the class described comprising a vertically descending foraminous screen, a substantially horizontal receiver, means to drop mica flakes in front of the descending screen, means to create a suction behind the descending screen whereby to draw a layer of flakes unto said screen and means to deflect the screen below the suction creating means and guide the screen above the receiver whereby the flakes adhering to the screen may fall by gravity onto the receiver.

18. A device of the class described comprising a receiver into which mica flakes may be deposited by gravity, means forming a confining chamber, means creating a cloud of mica flakes in said chamber, and means opening into said chamber for selecting a substantially uniform grade of mica flakes from said cloud and depositing said selected flakes into the receiver.

19. A device of the class described comprising a receiver into which mica flakes may be deposited by gravity, means forming a confining chamber, means creating a cloud of mica flakes in said chamber, means opening into said chamber for selecting a substantially uniform grade of mica flakes from said cloud and depositing said selected flakes into the receiver, said means including a suction device positioned adjacent the cloud of mica flakes and above the receiver whereby to select a uniform grade of flakes and transfer means for transferring the flakes from the suction device to the receiver.

20. A device of the class described comprising a moving conveyor for the mica flakes, a plurality of suction devices, means for creating a cloud of mica flakes adjacent said suction devices whereby to permit the separation of a substantially uniform grade of mica flakes from said cloud and transfer means for removing the separated flakes and depositing same on the conveyor in a double layer.

21. In a machine of the class described, a pair of suction devices, means for creating a cloud of mica flakes adjacent said devices whereby to permit said devices to separate mica flakes from the cloud by suction, a moving conveyor traveling around one of said devices and across the face thereof exposed to the cloud of flakes to thus receive as a layer the flakes separated by said device, and means for transferring flakes from the other device to the conveyor and depositing them thereon as a blanket covering the first layer.

22. A device of the class described comprising a vertically descending foraminous screen, a substantially horizontal receiver, means to drop mica flakes in front of the descending screen, means to create a suction behind the descending screen whereby to draw a layer of a substantially uniform grade of flakes unto said screen, and means to deflect the screen below the suction creating means and guide the screen above the receiver whereby the flakes, adhering to the screen, may be delivered by gravity to the receiver.

23. A device of the class described comprising a receiver into which mica flakes may be deposited by gravity, means forming a confining chamber, means creating a cloud of mica flakes in said chamber, means comprising a suction element opening into said chamber for selecting a substantially uniform grade of mica flakes from said cloud, and means comprising a foraminous conveyor having portions extending within the chamber in front of the suction element and portions extending to a remote flake delivery point outside of the chamber for removing and delivering said selected flakes to the receiver.

24. A device of the class described comprising a receiver into which mica flakes may be deposited by gravity, means forming a confining chamber, means creating a cloud of mica flakes in said chamber, pneumatic means opening into said chamber for selecting a substantially uniform grade of mica flakes from said cloud and means including a carrier cooperating with the pneumatic means within said chamber and extending to a remote flake delivery point outside of said chamber for removing the selected flakes from the chamber and delivering them to the receiver.

25. A device of the class described comprising in combination a mica flake receiver, means forming a chamber having an opening, means for creating a cloud of mica flakes in said chamber, pneumatic means extending in said opening and exposed to the interior of the chamber for selecting a substantially uniform grade of mica flakes from said cloud within the chamber and an endless conveyor having a portion extending through said opening and cooperating with the pneumatic means within the chamber for receiving the flakes selected thereby, said conveyor having portions extending out of the chamber, and means to shift the conveyor to carry the flakes, received thereby, out of the chamber, said conveyor being arranged for delivering said flakes to the receiver.

26. A device of the class described comprising means forming an enclosing casing having an opening means for feeding mica flakes into the casing as a cloud, a continuously movable conveyor having a portion extending in said opening, suction means mounted in said opening behind the portion of the conveyor exposed therein, said suction means being adapted to separate a substantially uniform grade of mica flakes by drawing the lighter flakes, from the cloud in the casing, onto the conveyor portions exposed in the opening, and means to shift the conveyor to remove the so selected flakes from the casing through said opening and separate means for receiving the flakes thus removed.

27. A mica treating machine comprising, in combination, means forming a compartment having a lateral opening, means to create a cloud of mica flakes in said compartment so that a cloud of mica flakes will float downwardly, a perforated member exposed to the interior of the compartment at said opening, means to create a suction behind the portions of the member exposed in said opening to draw the lighter flakes in the cloud onto and cause same to adhere upon the perforated member, and means to shift the member to carry the so selected flakes out of the compartment through said lateral opening.

28. A machine for treating mica flakes including mica flake feeding means comprising a tower, a foraminated tumbling drum mounted in the top of the tower and adapted to snow a cloud of mica flakes into the tower so that the cloud may float downwardly through the tower under the influence of gravity, a suction device opening into the tower for the purpose of cleaning the flakes and to separate the lighter from the heavier flakes by drawing the lighter flakes toward the suction device, and a continuously moving conveyor having a stretch traveling across the face of the suction device so that the separated lighter flakes may be drawn by the suction device onto the conveyor, said conveyor comprising an air pervious belt and having a stretch extending outside of the tower to a remote discharge point whereby the flakes drawn to the conveyor by the suction device may be removed from the tower and discharged at said remote point.

29. A mica treating apparatus comprising a restricted compartment having side walls, means for creating a cloud of mica flakes within said compartment, means for selecting and withdrawing the lighter flakes from the compartment, said means comprising a downwardly and thence outwardly traveling foraminous member extending opposite an opening formed in the walls of the compartment and shiftable to carry mica flakes adhering thereto out of the compartment through said opening, and means to create a suction behind the foraminous member to draw mica flakes from the compartment unto the portion of the foraminous member exposed within the compartment.

30. A mica treating device comprising the combination of a housing forming a substantially vertical channel, a rotatable screen mounted in the upper portions of the channel whereby mica flakes, introduced onto the screen, may be snowed into the channel in the form of a cloud moving downwardly in the channel under the influence of gravity, said housing having a lateral opening below the snowing screen, a continuous flexible air pervious conveyor mounted on guides with a portion extending in said opening and exposed to the interior of the channel, means to shift said screen downwardly of said opening and thence outwardly of the housing, suction means behind said screen at its point of exposure opposite the opening in position to draw a current of air therethrough in order to adhere mica flakes onto the conveyor whereby the same may be carried by the conveyor out of the channel through said opening and be deposited at a remote point outside of the housing when the conveyor passes from the sphere of influence of the suction device.

In witness whereof, I have hereunto subscribed my name.

LOUIS T. FREDERICK.